US008742909B2

(12) United States Patent
Abuelsaad et al.

(10) Patent No.: US 8,742,909 B2
(45) Date of Patent: Jun. 3, 2014

(54) VEHICLE-INDUCED ROADWAY DEBRIS MONITORING

(75) Inventors: Tamer E. Abuelsaad, Poughkeepsie, NY (US); John E. Moore, Jr., Brownsburg, IN (US); Rajeshkumar N. Singi, Marietta, GA (US); Robert R. Wentworth, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 8 days.

(21) Appl. No.: 13/543,988

(22) Filed: Jul. 9, 2012

(65) Prior Publication Data

US 2014/0009308 A1 Jan. 9, 2014

(51) Int. Cl.
*B60Q 1/00* (2006.01)
*G08G 1/16* (2006.01)

(52) U.S. Cl.
USPC .......... 340/435; 340/903

(58) Field of Classification Search
USPC ......... 340/435, 436, 641, 903, 905, 931, 937; 701/45, 117, 301; 348/143, 148; 280/738, 740
See application file for complete search history.

(56) References Cited

U.S. PATENT DOCUMENTS

| | | | | |
|---|---|---|---|---|
| 7,123,165 | B2 * | 10/2006 | Davenport et al. | 340/931 |
| 7,154,403 | B2 * | 12/2006 | Davenport et al. | 340/641 |
| 7,481,453 | B2 * | 1/2009 | Breed | 280/738 |
| 7,633,383 | B2 * | 12/2009 | Dunsmoir et al. | 340/435 |
| 8,112,219 | B2 | 2/2012 | Johnson et al. | |
| 8,466,962 | B2 * | 6/2013 | Hutchison | 348/148 |
| 2007/0093247 | A1 | 4/2007 | Yaqub | |
| 2007/0203637 | A1 | 8/2007 | Passman et al. | |
| 2009/0164147 | A1 | 6/2009 | Kithil et al. | |
| 2011/0131074 | A1 | 6/2011 | Gilleland et al. | |
| 2011/0190972 | A1 * | 8/2011 | Timmons et al. | 701/29 |
| 2011/0320111 | A1 | 12/2011 | Sarma et al. | |

FOREIGN PATENT DOCUMENTS

WO 2011127363 A2 10/2011

* cited by examiner

*Primary Examiner* — Van T. Trieu
(74) *Attorney, Agent, or Firm* — Matthew Chung; Hoffman Warnick LLC

(57) ABSTRACT

A solution for monitoring vehicles for vehicle-induced roadway debris is provided. A reporting vehicle can include a set of sensors for detecting an incident relating to roadway debris. The reporting vehicle can automatically report the incident to a computer system, which can update an incident record for one or more monitored vehicles associated with the incident. The computer system can identify a set of monitored vehicles based on location data for each monitored vehicle and/or the reporting vehicle can be a monitored vehicle. The computer system can determine that a monitored vehicle is an unsafe vehicle and can initiate a safety action in response to the determination.

20 Claims, 3 Drawing Sheets

VEHICLE-INDUCED ROADWAY DEBRIS MONITORING

TECHNICAL FIELD

The disclosure relates generally to monitoring vehicles, and more particularly, to monitoring for vehicles causing roadway debris.

BACKGROUND ART

Vehicles traveling along a road often sustain damage from being hit by debris falling from other vehicles, particularly large vehicles such as utility trucks. The falling debris can result from safety negligence on the part of the vehicle operator and/or owner. Repairs to vehicles as a result of debris impacts can be costly to the owners (e.g., when damage is not covered by insurance, due to high deductible, and/or the like) and insurers (e.g., when covering claims made by the insured). Furthermore, falling debris can present a substantial hazard for a motorcyclist, an individual riding in a vehicle with the window open, an individual riding in a convertible vehicle with the top down, and/or the like, as well as when it penetrates a vehicle component (e.g., windshield, wheel, etc.).

Various types of vehicles are equipped with different sensors that can detect damage and/or malfunctioning equipment on the vehicle. Additionally, various types of vehicles, particularly industrial vehicles, are equipped with devices that periodically broadcast location information for the vehicle. In the field of shared vehicles, such as public transportation vehicles, an approach for collecting and disseminating crowd-sourced information relating to a shared vehicle has been proposed. In this case, users of mobile client devices can provide information regarding the shared vehicle on which they are riding. The information, such as predicted arrival/departure times, a condition of the shared vehicle, and/or the like, can be shared with other users and/or a customer service system affiliated with the shared vehicle.

SUMMARY OF THE INVENTION

Aspects of the invention provide a solution for monitoring vehicles for vehicle-induced roadway debris. A reporting vehicle can include a set of sensors for detecting an incident relating to roadway debris. The reporting vehicle can automatically report the incident to a computer system, which can update an incident record for one or more monitored vehicles associated with the incident. The computer system can identify a set of monitored vehicles based on location data for each monitored vehicle and/or the reporting vehicle can be a monitored vehicle. The computer system can determine that a monitored vehicle is an unsafe vehicle and can initiate a safety action in response to the determination.

A first aspect of the invention provides a computer-implemented method of monitoring vehicles, the method comprising: receiving a debris report of an incident relating to vehicle-induced roadway debris from a reporting vehicle on a computer system, wherein the debris report is automatically generated by the reporting vehicle in response to detection of the incident; updating, by the computer system and for each of at least one monitored vehicle, a corresponding incident record for the monitored vehicle based on the debris report; evaluating, by the computer system and for each of the at least one monitored vehicle, the updated incident record to determine whether the corresponding monitored vehicle is an unsafe vehicle; and initiating, by the computer system, a safety action for a monitored vehicle in response to a determination that the monitored vehicle is an unsafe vehicle.

A second aspect of the invention provides a system comprising: a set of computing devices for implementing a method of monitoring vehicles, the method comprising: receiving a debris report of an incident relating to vehicle-induced roadway debris from a reporting vehicle, wherein the debris report is automatically generated by the reporting vehicle in response to detection of the incident; updating, for each of at least one monitored vehicle, a corresponding incident record for the monitored vehicle based on the debris report; evaluating, for each of the at least one monitored vehicle, the updated incident record to determine whether the corresponding monitored vehicle is an unsafe vehicle; and initiating a safety action for a monitored vehicle in response to a determination that the monitored vehicle is an unsafe vehicle.

A third aspect of the invention provides a system comprising: a reporting vehicle including an onboard computer system for performing a reporting method comprising: receiving data corresponding to an incident relating to vehicle-induced roadway debris from a set of sensors located on the reporting vehicle; automatically generating a debris report based on the data; and automatically transmitting the debris report for processing by a monitoring computer system remote from the vehicle; and the monitoring computer system, wherein the monitoring computer system performs a monitoring method comprising: updating, for each of at least one monitored vehicle, a corresponding incident record for the monitored vehicle in response to receiving the debris report; and evaluating, for each of the at least one monitored vehicle, the updated incident record to determine whether the corresponding monitored vehicle is an unsafe vehicle.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring vehicles for vehicle-induced roadway debris. A reporting vehicle can include a set of sensors for detecting an incident relating to roadway debris. The reporting vehicle can automatically report the incident to a computer system, which can update an incident record for one or more monitored vehicles associated with the incident. The computer system can identify a set of monitored vehicles based on location data for each monitored vehicle and/or the reporting vehicle can be a monitored vehicle. The computer system can determine that a monitored vehicle is an unsafe vehicle and can initiate a safety action in response to the determination. As used herein, unless otherwise noted, the term "set" means one or more (i.e., at least one) and the phrase "any solution" means any now known or later developed solution.

In general, an embodiment enables identification of a vehicle, such as a commercial/fleet vehicle, which may not be properly utilizing one or more of various safety features included to protect other vehicles traveling on the road. Such safety features can include, for example, mud flaps, properly securing cargo, properly securing cargo areas, and/or the like. Improper use of such safety features can result in vehicle-induced roadway debris, e.g., debris propelled from a vehicle tire and impacting a nearby vehicle, debris falling from a vehicle cargo area, debris lying in the roadway after having fallen from a vehicle, and/or the like. While such debris may not result in an accident, the debris can result in damage to other vehicles, which can be costly to repair and/or insure against for the owners of the other vehicles.

Figure 1:
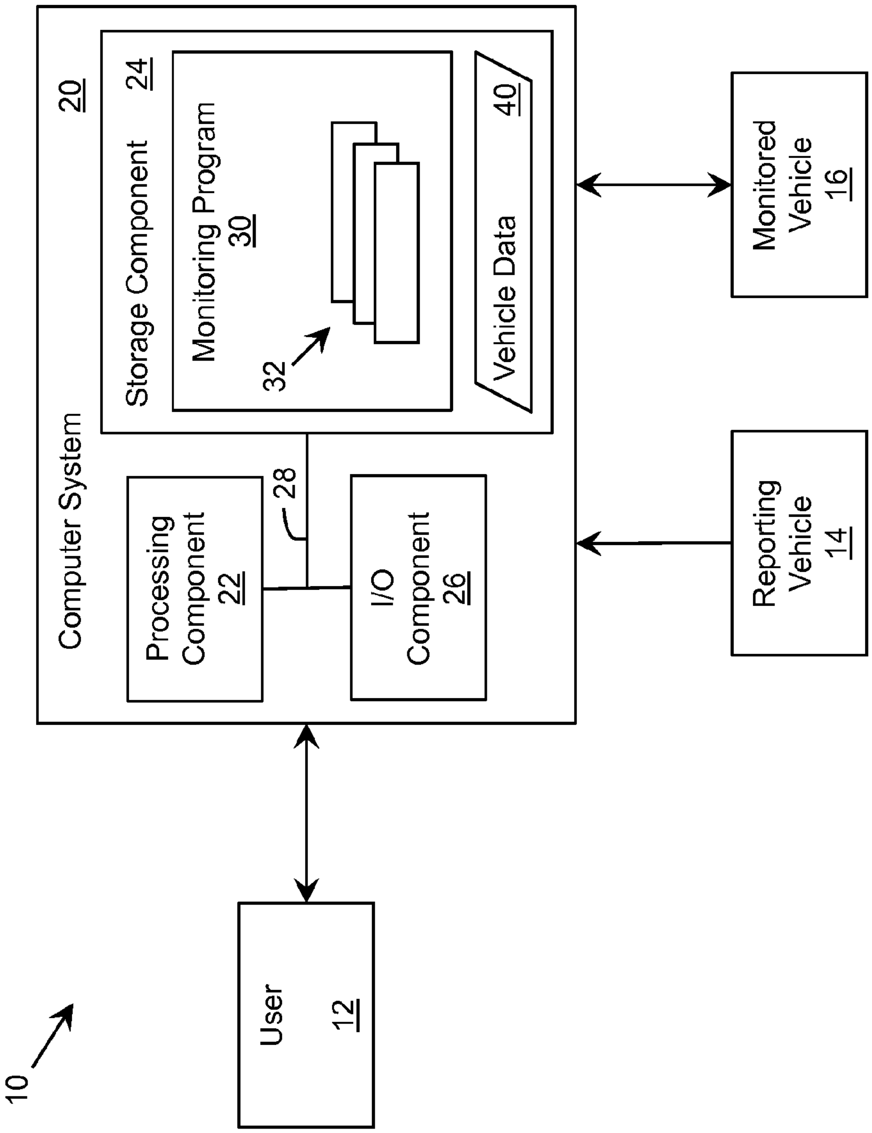
FIG. 1 shows an illustrative environment for monitoring vehicles according to an embodiment.

Turning to the drawings, FIG. 1 shows an illustrative environment 10 for monitoring vehicles, such as a monitored vehicle 16, according to an embodiment. To this extent, environment 10 includes a computer system 20 that can perform a process described herein in order to monitor vehicles. In particular, the computer system 20 is shown including a monitoring program 30, which makes the computer system 20 operable to monitor the vehicles by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the monitoring program 30, which is at least partially fixed in the storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the monitoring program 30 can manage a set of interfaces (e.g., graphical user interface(s), application program interface, and/or the like) that enable human and/or system users 12 to interact with the monitoring program 30. Furthermore, the monitoring program 30 can manage (e.g., store, retrieve, create, manipulate, organize, present, etc.) the data, such as vehicle data 40, using any solution.

In any event, the computer system 20 can comprise one or more general purpose computing articles of manufacture (e.g., computing devices) capable of executing program code, such as the monitoring program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the monitoring program 30 can be embodied as any combination of system software and/or application software.

Furthermore, the monitoring program 30 can be implemented using a set of modules 32. In this case, a module 32 can enable the computer system 20 to perform a set of tasks used by the monitoring program 30, and can be separately developed and/or implemented apart from other portions of the monitoring program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the monitoring program 30 fixed thereon (e.g., one or more modules 32). However, it is understood that the computer system 20 and the monitoring program 30 are only representative of various possible equivalent computer systems that may perform a process described herein. To this extent, in other embodiments, the functionality provided by the computer system 20 and the monitoring program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Further, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the monitoring program 30 enables the computer system 20 to monitor vehicles, such as the monitored vehicle 16. The monitored vehicle 16 can comprise any type of private, commercial, or fleet vehicle. In an embodiment, the monitored vehicle 16 comprises a commercial or fleet vehicle, such as a truck, a bus, a van, and/or the like. In this case, a business that owns the vehicle can be a user 12 of the computer system 20. For example, the business can receive information regarding one or more of its monitored vehicles 16 and provide information to the computer system 20 regarding maintenance or other actions taken with respect to the monitored vehicle 16 and/or an operator of the monitored vehicle 16. Regardless, various types of users 12 are possible as described herein including, for example, a third party monitoring service provider, an entity responsible for traffic safety and/or road maintenance, an insurer, a travel information service provider, and/or the like.

In general, the computer system 20 can receive information from one or more reporting vehicles 14 regarding an incident relating to vehicle-induced roadway debris. Such an incident can comprise, for example, debris falling from a vehicle, a presence of road debris that previously has fallen from a vehicle, debris kicked up from the wheels of the vehicle, and/or the like. The reporting vehicle 14 can be configured to automatically detect the incident and automatically transmit the information in response to detecting the incident.

Figure 2A:
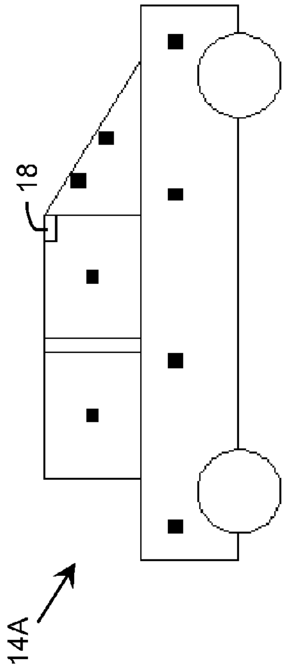
FIGS. 2A and 2B show illustrative reporting vehicles according to an embodiment.
Figure 2B:
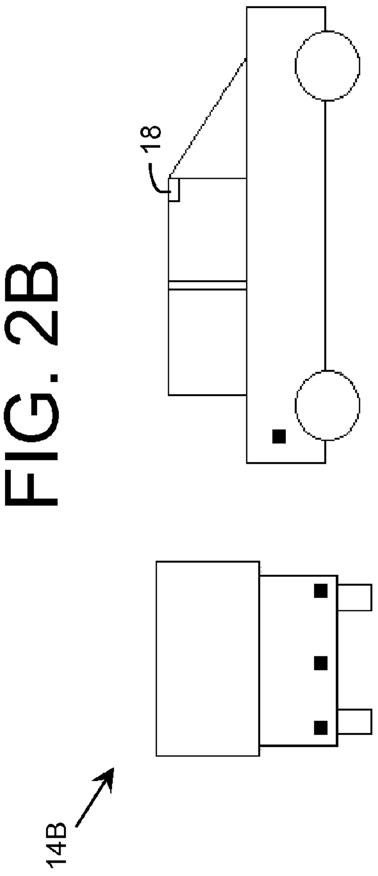

The reporting vehicle 14 can comprise any combination of one or more of various types of sensing devices for detecting the incident. For example, FIGS. 2A and 2B show illustrative reporting vehicles 14A, 14B, respectively, according to an embodiment. As illustrated, a reporting vehicle 14A, 14B can include a set of sensors (indicated by black squares) located on any combination of various external car body parts (e.g., windows, windshield, doors, panel, fender, hood, roof, etc.). The reporting vehicle 14A is shown including an illustrative set of sensors, which can detect an incident caused by debris from another vehicle on the roadway. The reporting vehicle 14B is shown including an illustrative set of sensors, which can detect an incident caused by debris falling from the reporting vehicle 14B itself. Regardless, it is understood that the configurations of sensors shown for the reporting vehicles 14A, 14B are only illustrative and various alternative configurations are possible. For example, while not shown, a reporting vehicle can include one or more sensors located on the front of the vehicle, below the vehicle, on top of the vehicle, and/or the like. Furthermore, a reporting vehicle can include sensors configured to detect both incidents caused by the vehicle as well as incidents caused by another vehicle on the roadway.

A reporting vehicle 14A, 14B can comprise any combination of various types of sensors. A sensor can comprise, for example, an impact or pressure detection sensor, which can generate a signal in response to detecting a minor impact on the corresponding car body part. The minor impact can comprise any impact that does not result from/in an accident/collision, but which can result in some damage to the reporting vehicle 14 (e.g., a cracked windshield, a minor dent on an external body part, and/or the like). Furthermore, a sensor can comprise an imaging or motion sensing device, which can be configured to detect debris falling from the rear of the reporting vehicle (e.g., as illustrated in FIG. 2B) and/or to identify one or more attributes of the debris, such as the relative size, direction of travel, type of debris, and/or the like.

Figure 3:
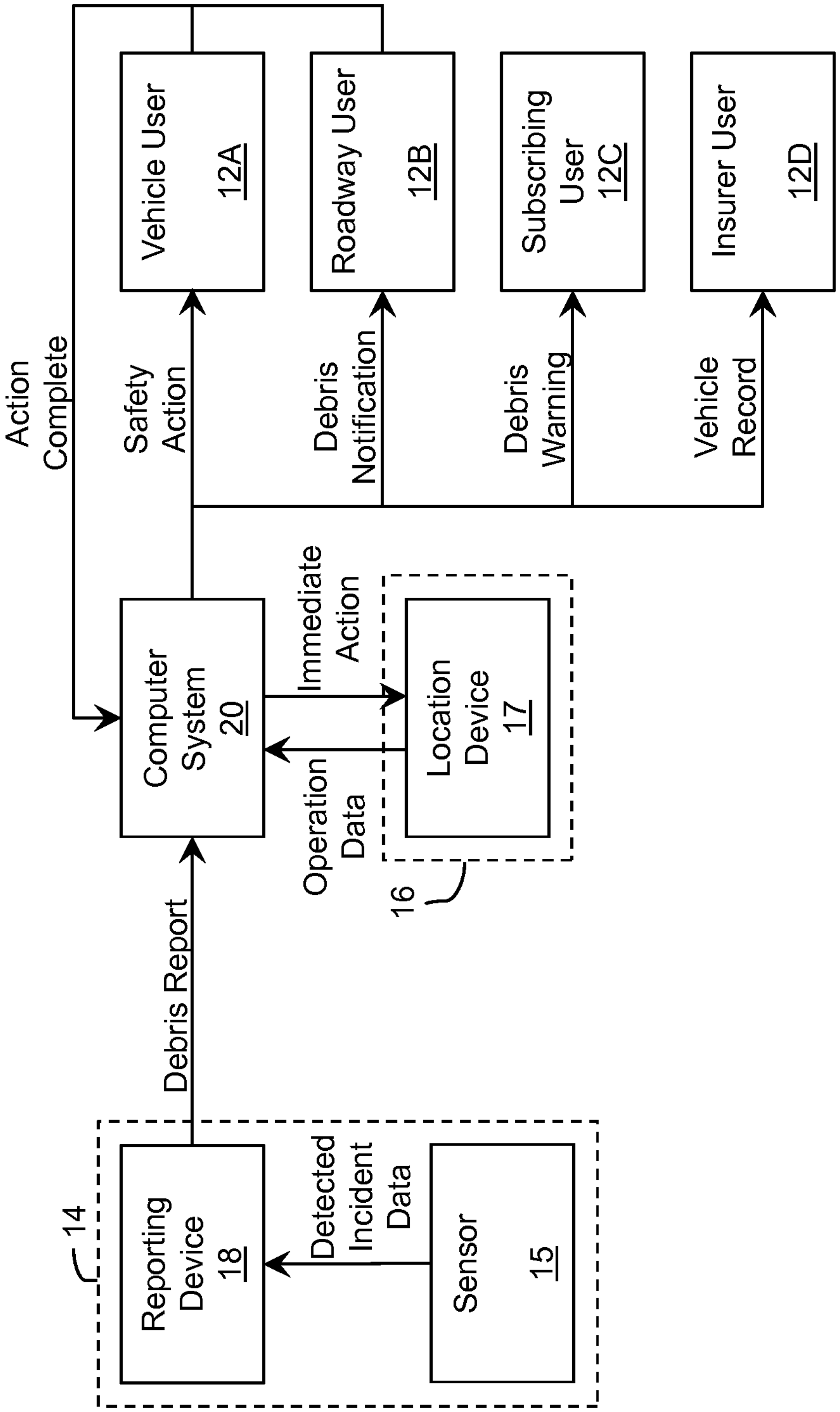
FIG. 3 shows an illustrative data flow diagram according to an embodiment.

Regardless, FIG. 3 shows an illustrative data flow diagram according to an embodiment. In response to detecting an incident, a sensor 15 can provide data corresponding to the detected incident for processing by a reporting device 18 located on the reporting vehicle 14. The reporting device 18 can comprise any type of computing device, which is capable of receiving and processing data from a set of sensors 15 located on the reporting vehicle 14 and is capable of communicating data to the computer system 20 using a wireless communications solution. In an embodiment, the set of sensors 15 and/or the reporting device 18 is configured to only detect or report an incident that occurs while the reporting vehicle 14 is moving, the reporting vehicle 14 is in gear, and/or the like. In this case, the reporting vehicle 14 will be less prone to generate false reports due to non-roadway debris incidents, non-debris incidents, and/or the like.

Furthermore, when sufficient data is available, the reporting device 18 can process the data received from the sensor 15 to determine whether the incident is likely due to vehicle-induced debris or from some other source (e.g., impact with an animal). For example, the reporting device 18 can process one or more of image data, debris attribute data (e.g., color, size, etc), the direction and/or speed of travel of the debris, and/or the like, to determine whether the detected incident is likely due to a vehicle. In an embodiment, the reporting device 18 can analyze the speed and direction of travel of the debris to determine whether the debris has attributes that correspond to its having fallen from a vehicle (e.g., generally downward, relatively slow movement), having been kicked up by a vehicle (e.g., relatively fast movement coming from the direction of a wheel), and/or the like.

In response to a determination that the incident should be reported, the reporting device 18 can automatically communicate a debris report including incident data regarding the incident for processing by the computer system 20. The reporting device 18 can communicate the debris report immediately after the incident is detected, as part of a periodic reporting of a set of detected incidents, and/or the like. In an embodiment, the reporting device 18 can determine when to communicate the debris report based on the type of incident detected (e.g., caused by the reporting vehicle or caused by another vehicle, large or small debris, and/or the like). The incident data can include, for example, an identification of the sensor/sensor location on the reporting vehicle 14, a size of the impact, information corresponding to the debris (e.g., direction of travel, size, shape, color, etc.), date/time information, and/or the like.

Furthermore, the incident data can include information corresponding to a geographic location of the reporting vehicle 14. The reporting device 18 can include, for example, a location sensing device such as a global positioning system (GPS) device, or the like. Alternatively, the reporting device 18 can obtain the location information from a location sensing device located in the reporting vehicle 14 (e.g., as part of an integrated navigation system for the vehicle). Additionally, the incident data can include identification information, which uniquely identifies the reporting vehicle 14. The identification information can be: anonymous identification information, which does not enable correlation of the incident with the actual reporting vehicle 14; partially anonymous identification information, which only enables correlation with the actual reporting vehicle 14 for certain users 12; or identification information that correlates the incident with the actual reporting vehicle 14 (e.g., when the reporting vehicle is a monitored vehicle 16). Even further, the incident data can include other information that may be relevant to analysis of the detected incident, which the reporting device 18 can acquire from one or more other systems implemented on the reporting vehicle 14. For example, the incident data can include information corresponding to a weather condition and/or road condition at the time of the incident, a status of one or more safety components (e.g., door or gate open/closed status), and/or the like.

The computer system 20 also can receive information from one or more monitored vehicles 16. For example, a monitored vehicle 16 can comprise a reporting device 18 (FIGS. 2A and 2B), which is configured to periodically provide operation data to the computer system 20. The operation data can include, for example, a geographic location, a unique identifier for the monitored vehicle 16, date/time information, and/or the like. In an embodiment, the operation data also includes additional information, such as an operating speed of the monitored vehicle 16, weight information corresponding to a load/total weight of the monitored vehicle 16, information corresponding to a current weather condition, a status of one or more safety systems (e.g., door or gate open/closed status), and/or the like. The monitored vehicle 16 can report the operation data using any type of reporting solution, including for example, automatically after a predetermined time, in response to a query received from the computer system 20, in response to an event (e.g., a change of roads, which can be detected by an onboard navigation system), and/or the like. Alternatively, the monitored vehicle 16 can provide the operation data to a third party computer system (e.g., a company system) and the computer system 20 can request operation data from the third party system periodically, in response to a debris report, and/or the like.

In any event, in response to receiving the debris report, the computer system 20 can update an incident record for one or more monitored vehicles 16. For example, the vehicle data 40 (FIG. 1) can include a vehicle record corresponding to each of a set of monitored vehicles 16. The vehicle record can include, for example, data uniquely identifying the corresponding monitored vehicle 16, contact information corresponding to the monitored vehicle 16, and an incident record corresponding to the monitored vehicle 16. The incident record can comprise, for example, a count of a number of reported incidents associated with the monitored vehicle 16. Furthermore, the incident record can include data on zero or more reported incidents for the monitored vehicle 16, such as date/time information, location information, incident information (e.g., severity of the debris), and/or the like. When the reporting vehicle 14 is the monitored vehicle 16 responsible for the incident (e.g., debris detected falling from the back of the vehicle), the computer system 20 can update the incident record of the monitored vehicle 16 accordingly.

However, when the reporting vehicle 14 is not the monitored vehicle 16 responsible for the incident, the computer system 20 can identify a set of monitored vehicles as being associated with the location corresponding to the incident, e.g., using a crowd-sourcing like technique. For example, the computer system 20 can identify all monitored vehicles 16, if any, that are currently within a predefined radius of a location identified in the debris report. Furthermore, the computer system 20 can identify any monitored vehicles 16 that have passed through the location within a predefined amount of time. Depending on one or more characteristics of the road and/or debris corresponding to the debris report, the computer system 20 can consider the direction of travel for any monitored vehicles 16 associated with the location. For example, a monitored vehicle 16 traveling the opposite direction on a divided highway can be evaluated differently from a monitored vehicle 16 traveling the opposite direction on a narrower road, such as a city or town road. Similarly, when the location is next to a location where more than one road is present, the computer system 20 can consider whether the monitored vehicle 16 was traveling on an overpass or underpass. Furthermore, the computer system 20 can adjust one or more of the factors based on other factors, such as the weight of the debris (e.g., flying material versus relatively heavy material, windy versus calm weather conditions, average speed of travel at the location, and/or the like). It is understood that the computer system 20 can enable a user 12 (FIG. 1) to configure the predefined radius, predefined amount of time, consideration of direction of travel, and/or other parameters using any solution.

In any event, for each monitored vehicle 16 associated with the location corresponding to the incident, the computer system 20 can update the incident record based on the debris report. As described herein, the incident record can comprise a count, which can be incremented for each monitored vehicle 16. Furthermore, the computer system 20 can update additional data included in the incident record, such as time/date information, a total number of monitored vehicles 16 associated with a particular incident, and/or the like.

The computer system 20 can evaluate the vehicle data 40 to determine whether any monitored vehicle 16 is an unsafe vehicle using any solution. For example, the computer system 20 can evaluate a monitored vehicle 16 as an unsafe vehicle in response to the incident count exceeding a configured threshold. The computer system 20 can consider such factors as an amount of time for the total incidents to have accrued to exceed the threshold, the number of other monitored vehicles 16 associated with one or more of the incidents, and/or the like, in order to determine whether the monitored vehicle 16 is an unsafe vehicle (e.g., using a weighted combination of the incidents).

In response to a determination that a monitored vehicle 16 is unsafe, the computer system 20 can initiate a safety action for the monitored vehicle 16. For example, when the computer system 20 associates a monitored vehicle 16 with numerous incidents in a short time (e.g., a single trip for the monitored vehicle 16), a potentially severe incident, and/or the like, the computer system 20 can provide a message to a driver of the monitored vehicle 16 requesting immediate action (e.g., inspection of cargo area, correction of malfunctioning equipment, and/or the like).

Furthermore, the computer system 20 can send a notification to an entity managing maintenance of a monitored vehicle 16 determined to be unsafe. To this extent, a vehicle user 12A can comprise an owner of the monitored vehicle 16, an operator of the monitored vehicle 16, and/or the like, and the computer system 20 can send a safety action message requesting the vehicle user 12A evaluate the monitored vehicle (e.g., perform an inspection), evaluate the conduct of the driver (e.g., to ensure compliance with all safety procedures), and/or the like. The computer system 20 can include some or all of the data in the incident record for the monitored vehicle 16, which can assist the vehicle user 12A in assessing the monitored vehicle 16 and/or driver. Additionally, based on the number and/or severity of the incident(s), the computer system 20 can require that the inspection be performed within a fixed amount of time (e.g., a specified number of days, prior to the next trip by the monitored vehicle 16, and/or the like). Once the inspection is completed, the vehicle user 12A can send a notification to the computer system 20 that the action is complete. In response, the computer system 20 can update the incident record, e.g., by resetting an incident count for the monitored vehicle 16 to zero, recording the repairs, if any, performed, and/or the like.

In response to receiving a debris report, the computer system 20 also can determine whether the incident will result in an unsafe roadway (e.g., large debris may be in travel lanes). When the computer system 20 determines that the location may be unsafe for vehicle travel, the computer system 20 can send a message to a roadway user 12B, such as a maintenance facility responsible for maintaining the road, providing the roadway user 12B with information on the incident. Alternatively, the roadway user 12B can access the vehicle data 40 to generate a representation, such as a map, corresponding to locations of various reported incidents. In response, the roadway user 12B can dispatch a road crew to a location having numerous incidents and/or a potentially severe incident to investigate and clean up any debris that may be present. Once a location corresponding to an incident has been investigated and/or cleaned, the roadway user 12B can notify the computer system 20 that the requested action has been completed, and the computer system 20 can update the vehicle data 40 based on the response.

Similarly, the computer system 20 can send a message to one or more subscribing users 12C in response to receiving a debris report, determining a potentially unsafe roadway, and/ or the like. For example, the computer system 20 can warn a subscribing user 12C that an incident relating to vehicle-induced roadway debris recently occurred at a location the subscribing user 12C is approaching. Such a warning can be given to various subscribing users 12C over a period of time until the computer system 20 receives notification from the roadway user 12B. Furthermore, the computer system 20 can warn a subscribing user 12C of a monitored vehicle 16 operating nearby, which has been associated with a recent incident and/or has a relatively high number of incidents associated therewith. The monitored vehicle 16 can be uniquely identified to the subscribing user 12C or a generic warning can be provided. In any event, such information can enable the subscribing user 12C to be more alert for the presence of roadway debris, a potentially unsafe vehicle, and/or the like.

The computer system 20 can perform additional analysis and/or reporting using the vehicle data 40. For example, the computer system 20 can analyze the vehicle data 40 to identify maintenance vehicles 16 that are repeatedly being flagged as unsafe, a fleet of maintenance vehicles 16 being flagged as unsafe an abnormally high number of times, and/or the like. In this case, another user, such as an insurer user 12D, a government agency, and/or the like, can be notified of the repeated violations. In response, the insurer user 12D can take one or more responsive actions. Furthermore, the computer system 20 can provide a report to the vehicle user 12A, the insurer user 12D, a government agency, and/or the like, e.g., periodically, in response to a request, and/or the like based on the vehicle data 40. The report can indicate, for example, the incident history for a set of maintenance vehicles 16 corresponding to the roadway user 12B. An insurer user 12D can use such data to increase/decrease an insurance rate charged to the roadway user 12B. Similarly, the roadway user 12B can use such data to improve business processes, such as driver training, identify vehicles in need of maintenance, and/or the like.

While shown and described herein as a method and system for monitoring vehicles, it is understood that aspects of the invention further provide various alternative embodiments. For example, in one embodiment, the invention provides a computer program fixed in at least one computer-readable medium, which when executed, enables a computer system to monitor vehicles. To this extent, the computer-readable medium includes program code, such as monitoring program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as monitoring program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for monitoring vehicles. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of monitoring vehicles, the method comprising:

receiving a debris report of an incident relating to vehicle-induced roadway debris from a reporting vehicle on a computer system, wherein the debris report is automatically generated by the reporting vehicle in response to detection of the incident;

updating, by the computer system and for each of at least one monitored vehicle, a corresponding incident record for the monitored vehicle based on the debris report, wherein the at least one monitored vehicle is distinct from the reporting vehicle;

evaluating, by the computer system and for each of the at least one monitored vehicle, the updated incident record to determine whether the corresponding monitored vehicle is an unsafe vehicle; and initiating, by the computer system, a safety action to be performed on a monitored vehicle in response to a determination that the monitored vehicle is an unsafe vehicle.

2. The method of claim 1, wherein the debris report includes location information corresponding to a location for the reporting vehicle, wherein the method further comprises identifying the at least one monitored vehicle as being associated with the location, and wherein the updating is performed in response to the identifying.

3. The method of claim 1, wherein the reporting vehicle includes a set of sensors for detecting the vehicle-induced roadway debris caused by the reporting vehicle.

4. The method of claim 1, wherein the reporting vehicle includes a set of sensors for detecting an impact of the vehicle-induced roadway debris on the reporting vehicle.

5. The method of claim 1, wherein the incident record comprises a count corresponding to a number of incidents associated with the corresponding monitored vehicle, and wherein the evaluating determines that the corresponding monitored vehicle is an unsafe vehicle in response to the count exceeding a preconfigured threshold.

6. The method of claim 1, wherein the safety action includes sending a notification to an entity managing maintenance of the monitored vehicle.

7. The method of claim 1, wherein the safety action includes dispatching a road crew to a location associated with the debris report.

8. The method of claim 1, further comprising:

receiving location data for a subscribing vehicle; and providing a warning to the subscribing vehicle in response to at least one of: identification of a recent incident corresponding to the location data or identification of a potentially unsafe monitored vehicle corresponding to the location data.

9. A system comprising:

a set of computing devices for implementing a method of monitoring vehicles, the method comprising:

receiving a debris report of an incident relating to vehicle-induced roadway debris from a reporting vehicle, wherein the debris report is automatically generated by the reporting vehicle in response to detection of the incident;

updating, for each of at least one monitored vehicle, a corresponding incident record for the monitored vehicle based on the debris report, wherein the at least one monitored vehicle is distinct from the reporting vehicle;

evaluating, for each of the at least one monitored vehicle, the updated incident record to determine whether the corresponding monitored vehicle is an unsafe vehicle; and initiating a safety action to be performed on a monitored vehicle in response to a determination that the monitored vehicle is an unsafe vehicle.

10. The system of claim 9, wherein the debris report includes location information corresponding to a location for the reporting vehicle, wherein the method further comprises identifying the at least one monitored vehicle as being associated with the location, and wherein the updating is performed in response to the identifying.

11. The system of claim 9, further comprising the reporting vehicle, wherein the reporting vehicle includes a set of sensors for detecting the vehicle-induced roadway debris caused by the reporting vehicle.

12. The system of claim 9, further comprising the reporting vehicle, wherein the reporting vehicle includes a set of sensors for detecting an impact of the vehicle-induced roadway debris on the reporting vehicle.

13. The system of claim 9, wherein the incident record comprises a count corresponding to a number of incidents associated with the corresponding monitored vehicle, and wherein the evaluating determines that the corresponding monitored vehicle is an unsafe vehicle in response to the count exceeding a preconfigured threshold.

14. The system of claim 9, wherein the safety action includes sending a notification to an entity managing maintenance of the monitored vehicle.

15. The system of claim 9, wherein the method further includes:

receiving location data for a subscribing vehicle; and providing a warning to the subscribing vehicle in response to at least one of: identification of a recent incident corresponding to the location data or identification of a potentially unsafe monitored vehicle corresponding to the location data.

16. A system comprising:

a reporting vehicle including an onboard computer system for performing a reporting method comprising:

receiving data corresponding to an incident relating to vehicle-induced roadway debris from a set of sensors located on the reporting vehicle;

automatically generating a debris report based on the data; and automatically transmitting the debris report for processing by a monitoring computer system remote from the vehicle; and the monitoring computer system, wherein the monitoring computer system performs a monitoring method comprising:

updating, for each of at least one monitored vehicle, a corresponding incident record for the monitored vehicle in response to receiving the debris report, wherein the at least one monitored vehicle is distinct from the reporting vehicle;

evaluating, for each of the at least one monitored vehicle, the updated incident record to determine whether the corresponding monitored vehicle is an unsafe vehicle; and initiating a safety action to be performed on a monitored vehicle in response to a determination that the monitored vehicle is an unsafe vehicle.

17. The system of claim 16, wherein the reporting vehicle includes a set of sensors for detecting the vehicle-induced roadway debris caused by the reporting vehicle.

18. The system of claim 16, wherein the reporting vehicle includes a set of sensors for detecting an impact of the vehicle-induced roadway debris on the reporting vehicle.

19. The system of claim 16, wherein the debris report includes location information corresponding to a location for the reporting vehicle, wherein the monitoring method further comprises identifying the at least one monitored vehicle as being associated with the location, and wherein the updating is performed in response to the identifying.

20. The system of claim 16, further comprising a subscribing vehicle, wherein the monitoring method further includes:

receiving location data for the subscribing vehicle; and providing a warning to the subscribing vehicle in response to at least one of: identification of a recent incident corresponding to the location data or identification of a potentially unsafe monitored vehicle corresponding to the location data.

* * * * *